(12) United States Patent
Nigmatulin

(10) Patent No.: US 7,465,152 B2
(45) Date of Patent: Dec. 16, 2008

(54) ANGEL WING SEALS FOR TURBINE BLADES AND METHODS FOR SELECTING STATOR, ROTOR AND WING SEAL PROFILES

(75) Inventor: Tagir Robert Nigmatulin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 525 days.

(21) Appl. No.: 11/229,096

(22) Filed: Sep. 16, 2005

(65) Prior Publication Data

US 2007/0224035 A1 Sep. 27, 2007

(51) Int. Cl.
*F04D 29/08* (2006.01)

(52) U.S. Cl. .................. 415/170.1; 415/174.3
(58) Field of Classification Search ........... 415/173.7, 415/174.3, 173.1, 173.3, 173.4, 170.1; 416/193 A, 416/239
See application file for complete search history.

(56) References Cited

U.S. PATENT DOCUMENTS

| | | | |
|---|---|---|---|
| 3,761,200 A * | 9/1973 | Gardiner | 416/220 R |
| 4,815,933 A | 3/1989 | Hansel et al. | |
| 4,883,405 A | 11/1989 | Walker | |
| 5,211,536 A | 5/1993 | Ackerman et al. | |
| 5,224,822 A | 7/1993 | Lenahan et al. | |
| 5,302,086 A | 4/1994 | Kulesa et al. | |
| 5,388,962 A | 2/1995 | Wygle et al. | |
| 5,924,843 A | 7/1999 | Staub et al. | |
| 6,095,750 A | 8/2000 | Ross et al. | |
| 6,132,174 A | 10/2000 | Staub et al. | |
| 6,382,914 B1 | 5/2002 | Tressler | |
| 6,390,774 B1 | 5/2002 | Lewis et al. | |
| 6,402,471 B1 | 6/2002 | Demers et al. | |
| 6,506,016 B1 | 1/2003 | Wang | |
| 6,558,121 B2 | 5/2003 | Zhu et al. | |
| 6,672,832 B2 | 1/2004 | Leeke et al. | |
| 6,727,459 B1 | 4/2004 | Bialach | |
| 6,773,229 B1 | 8/2004 | Itzel et al. | |
| 6,923,616 B2 | 8/2005 | McRae, Jr. et al. | |

* cited by examiner

*Primary Examiner*—Edward Look
*Assistant Examiner*—Dwayne J White
(74) *Attorney, Agent, or Firm*—Armstrong Teasdale LLP

(57) ABSTRACT

Angel wing seals for turbines are described. In one aspect, an angel wing seal between a rotor blade and nozzle in a turbine inhibits ingestion of hot gas from a hot gas flow through the turbine into turbine wheel spaces. The seal includes, in an example embodiment, a seal body extending from a shank of the blade and generally toward the nozzle. The seal body has at least one concave surface.

15 Claims, 3 Drawing Sheets

ANGEL WING SEALS FOR TURBINE BLADES AND METHODS FOR SELECTING STATOR, ROTOR AND WING SEAL PROFILES

BACKGROUND OF THE INVENTION

The present invention relates generally to rotary machines and, more particularly, to angel wing seals.

Wheel space cavities of gas turbines are purged with cooling air from a compressor to maintain the temperature of the wheel space and rotor within a desired temperature range, and to prevent hot gas path ingestion. Angel wing seals are provided to seal the wheel space cavity. Specifically, angel wing seals are axial extensions of a turbine rotor blade, i.e., a bucket, which form a seal by overlapping with nozzle seal lands forming part of the fixed component of a turbine. Typically, angel wing seals are cast integrally as part of the blade or bucket. The specific profile of the angel wing seal and the surface of the stator should be selected to facilitate preventing hot gas path ingestion and reduce the usage of cooling air.

BRIEF DESCRIPTION OF THE INVENTION

In one aspect, a seal between a rotor blade and nozzle in a turbine for inhibiting ingestion of hot gas from a hot gas flow through the turbine into turbine wheel spaces is described. The seal includes, in an example embodiment, a seal body extending from a shank of the blade and generally toward the nozzle. The seal body has at least one concave surface.

In another aspect, a method for forming a seal arrangement in a turbine is described. The turbine has a rotor rotatable about an axis, blades carried by the rotor for rotation therewith, and nozzles. An angel wing seal is between a rotor blade and nozzle for inhibiting ingestion of hot gas from a hot gas flow through the turbine into turbine wheel spaces. The angel wing seal has a body extending from a shank of the blade and generally toward the nozzle. The method includes forming at least one concave surface in the angel wing body.

In yet another aspect, an angel wing seal of a rotor rotatable about an axis in a turbine is described. In the turbine, blades are carried by the rotor for rotation therewith, and the turbine further includes nozzles. The angel wing seal inhibits ingestion of hot gas from a hot gas flow through the turbine into turbine wheel spaces. The angle wing seal includes a seal body extending from a shank of the blade and generally toward the nozzle. The seal body includes at least one concave surface.

DETAILED DESCRIPTION OF THE INVENTION

Figure 1:
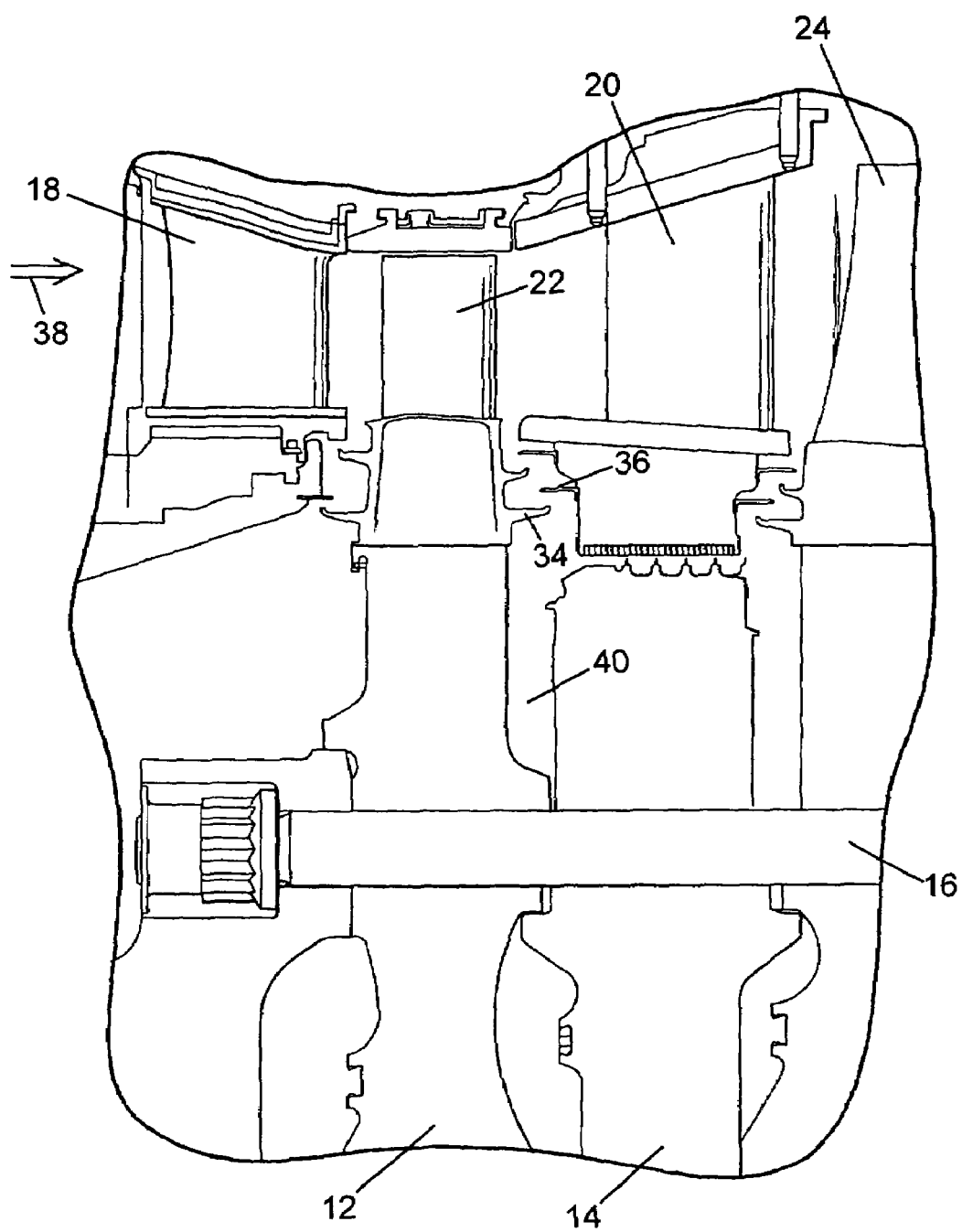
FIG. 1 is a is a fragmentary schematic illustration of a cross-section of a portion of a turbine.

FIG. 1 schematically illustrates a section of a gas turbine, generally designated 10, including a rotor having axially spaced rotor wheels 12 and spacers 14 joined one to the other by a plurality of circumferentially spaced, axially extending bolts 16. Turbine 10 includes various stages having nozzles, for example, first-stage nozzles 18 and second-stage nozzles 20 having a plurality of circumferentially spaced stator blades. Between the nozzles and rotating with the rotor are a plurality of rotor blades, e.g., first and second-stage rotor blades 22 and 24, respectively, being illustrated.

Figure 2:
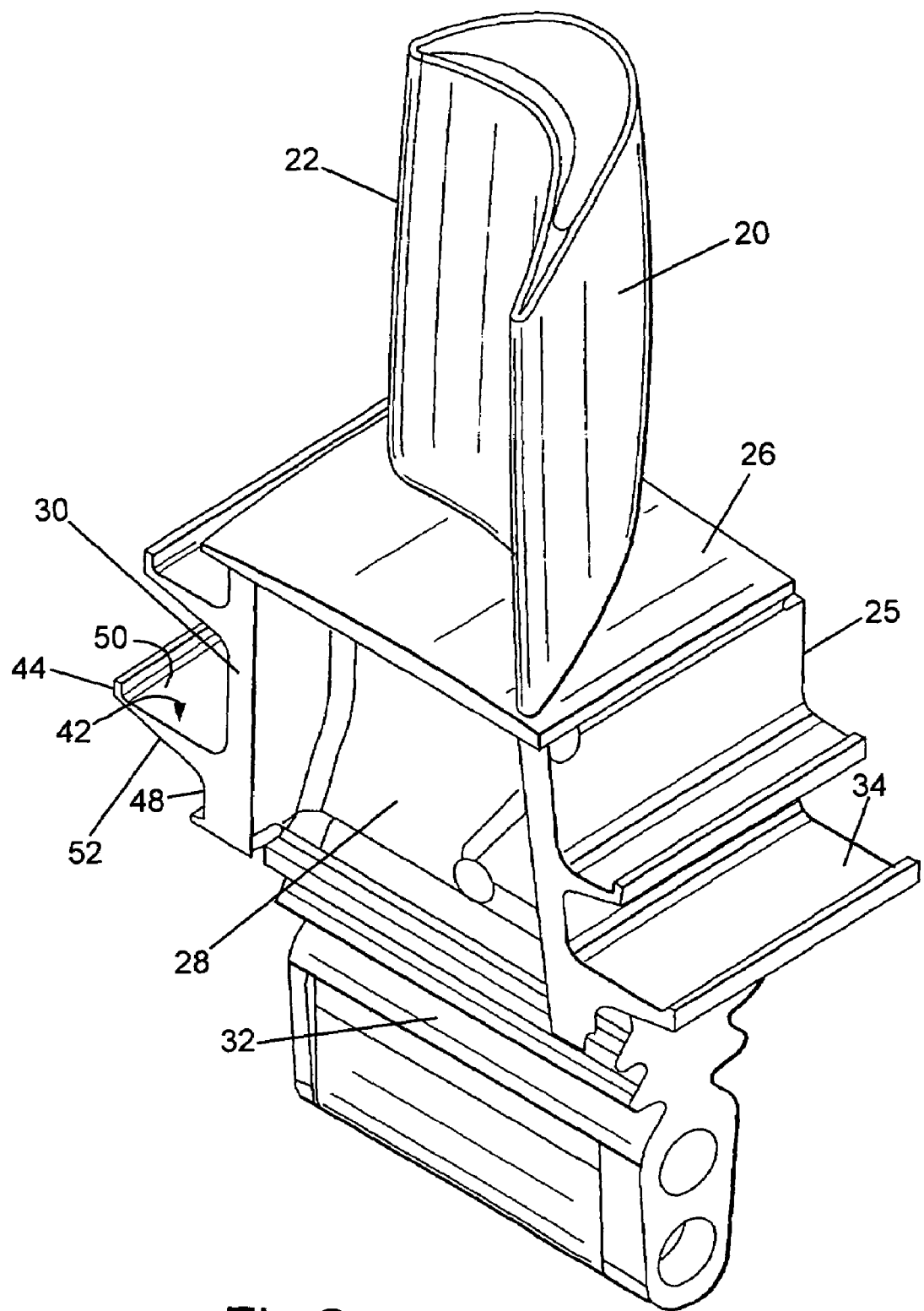
FIG. 2 is an enlarged perspective view of a turbine blade.

Referring to FIG. 2, each rotor blade, for example, rotor blade 22 includes an airfoil 24 mounted on a shank 25 including a platform 26 and a shank pocket 28 having integral cover plates 30 and a dovetail 32 for connection with generally corresponding dovetail slots formed on rotor wheel 12 (FIG. 1). Bucket 22 is typically integrally cast and includes axially projecting angel wing seals 34. Seals 34 cooperate with lands 36 (see FIG. 1) formed on the adjacent nozzles to limit ingestion of the hot gases flowing through the hot gas path, generally indicated by the arrow 38 (FIG. 1), from flowing into wheel spaces 40.

Typically, angel wing seals 34 include an angel wing body 42, an upturn or tip 44 at its distal end, upper and lower angel wing root blends indicated 46 and 48, respectively, and upper and lower seal body surfaces 50 and 52, respectively. Conventionally, upper and lower surfaces 50 and 52 are linear surfaces extending from the root blend to tip 44, typically with the upper surface 50 having an arcuate surface concentric about the axis of rotation of the rotor.

Figure 3:
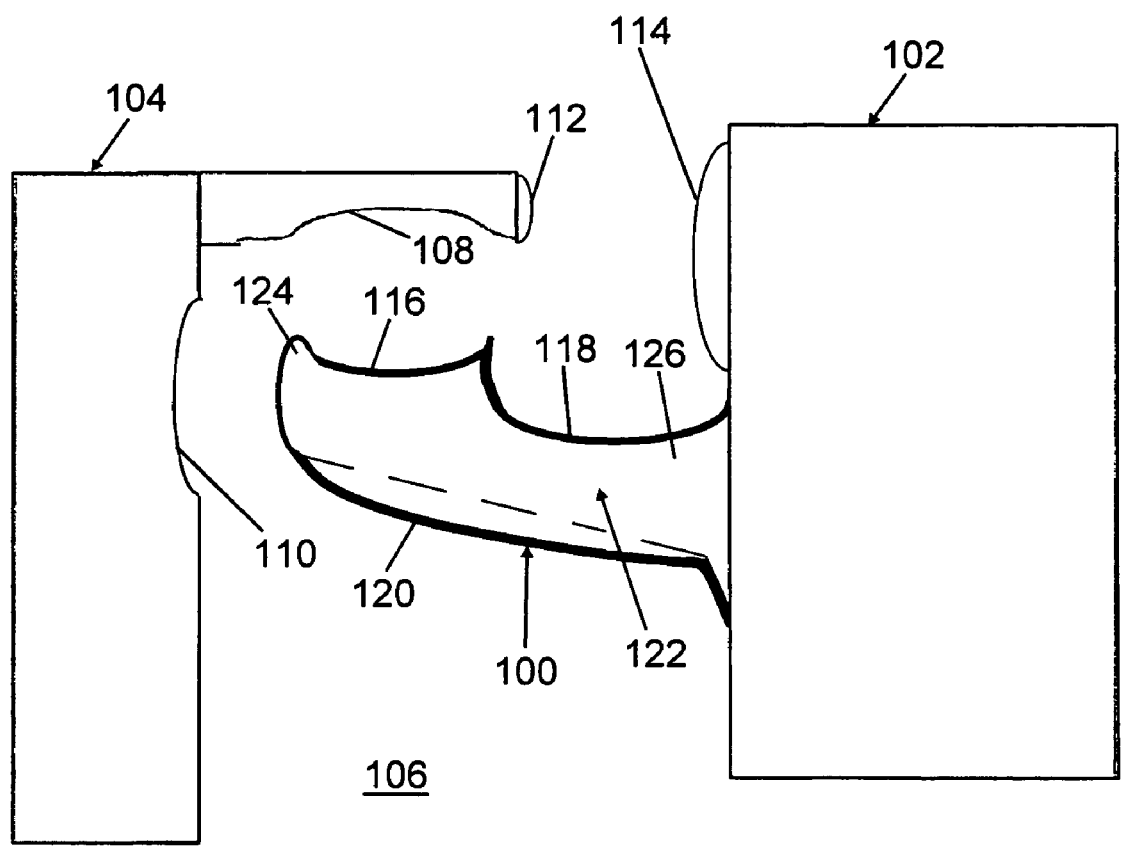
FIG. 3 is a diagram of example stator and rotor profiles.

FIG. 3 illustrates profiles of an angel wing 100, a rotor body 102, and a stator 104 in accordance with one embodiment of the present invention. The profiles facilitate creating a pattern of high and low pressures in wheel space 106. The profiles are selected, at least in part, based on Bernoulli's law, which provides that for a non-viscous, incompressible fluid in steady flow, the sum of pressure, potential and kinetic energies per unit volume is constant at any point. More specifically, Bernoulli's law describes the behavior of a fluid under varying conditions of flow and height, and provides:

$$P + \tfrac{1}{2}pv^2 + pgh = \text{constant}$$

where P is the static pressure (in Newtons per square meter), p is the fluid density (in kg per cubic meter), v is the velocity of fluid flow (in meters per second), g is gravitational acceleration, and h is the height above a reference surface. The second term in this equation is known as dynamic pressure.

As shown in FIG. 3, and in the example embodiment, stator 104 includes concave surfaces 108 and 110 and a stator protrusion 112, and rotor body 102 includes a rotor protrusion 114. Angel wing 100 also includes concave surfaces 116 and 118 as well as an outwardly curved lower surface 120. These profile features in stator 104, rotor 102 and angel wing 100 can be formed by any one or combination of the following processes, namely, casting, machining, welding, and TBC/abradable coating.

With respect to angel wing 100 (sometimes referred to herein as a seal), wing 100 includes a seal body 122 extending from the shank of the blade and generally toward nozzle 104. Seal body 122 has at least one concave surface. In the example embodiment, seal body 122 has first concave surface 116 at a tip 124 thereof and second concave surface 118 along a length of a body portion 126 extending from rotor. Seal body 122 also has outwardly curved surface 120 along length of body portion 126. Nozzle 104 has first protrusion 112 extending towards rotor 102 and concave surfaces 108 and 110. Rotor 102 has protrusion 114.

Of course, many other configurations and profiles are possible. Generally, protrusions 112 and 114 cause a decrease in pressure and concave surfaces 108, 110, 116, and 118 cause an increase in pressure. More specifically, changes in the leakage/flow area cause subsequent increases or decreases in velocity and pressure. During transfer from higher velocity to lower velocity, air expands and pressure increases in the wheel space cavity, such that the increased pressure creates a "buffer".

As sometimes described herein, stator 104 and rotor 102 (including angel wing 100) form a seal arrangement or assembly that facilitates hot gas path ingestion as well as efficient use of cooling air to cool rotor 102 to maintain rotor 102 within a selected operation temperature range and temperature gradient. Although the methods and systems described and/or illustrated herein are described and/or illustrated with respect to a rotating machine, and more specifically a gas turbine, practice of the methods and systems described and/or illustrated herein is not limited to gas turbines. Rather, the methods and systems described and/or illustrated herein are applicable to assembling seal arrangements on many different types of turbines including, for example, steam turbines.

Exemplary embodiments of seal arrangements are described above in detail. The methods are not limited to the specific embodiments described herein nor to the specific seal arrangements assembled, but rather, the seal arrangements may be utilized independently and separately from other methods described herein or to assemble seal arrangements not described herein. For example, other seal arrangements can also be assembled using the methods described herein.

While the invention has been described in terms of various specific embodiments, those skilled in the art will recognize that the invention can be practiced with modification within the spirit and scope of the claims.

What is claimed is:

1. In a turbine having a rotor rotatable about an axis, blades carried by said rotor for rotation therewith and nozzles, a seal between a rotor blade and nozzle for inhibiting ingestion of hot gas from a hot gas flow through the turbine into turbine wheel spaces, comprising:
    a seal body extending from a shank of said blade to a tip and generally toward the nozzle;
    said seal body comprising a first concave surface defined at said tip, and an outwardly curved surface defined along a length of a body portion extending from the rotor to said tip, said outwardly curved surface is radially inward from said first concave surface and extends outwardly from said seal body.

2. A seal according to claim 1 wherein said seal body further comprises a second concave surface defined along a length of a body portion extending from the rotor to said first concave surface.

3. A seal according to claim 1 wherein the nozzle comprises a first protrusion extending towards the rotor.

4. A seal according to claim 1 wherein the nozzle comprises at least one concave surface.

5. A seal according to claim 1 wherein the rotor comprises at least one protrusion extending outward from said rotor.

6. A method for forming a seal arrangement in a turbine having a rotor rotatable about an axis, blades carried by said rotor for rotation therewith and nozzles, an angel wing seal between a rotor blade and nozzle for inhibiting ingestion of hot gas from a hot gas flow through the turbine into turbine wheel spaces, the angel wing seal having a body extending from a shank of the blade to a tip and generally toward the nozzle, said method comprising forming a first concave surface in the angel wing body at the angel wing tip; and forming an outwardly curved surface along a length of a body portion of the angel wing extending from the rotor to the tip, wherein the outwardly curved surface is radially inward from the first concave surface and extends outwardly from the angel wing body.

7. A method according to claim 6 further comprising forming a second concave surface along a length of a body portion extending from the rotor to the first concave surface.

8. A method according to claim 6 further comprising forming a first protrusion extending from the nozzle towards the rotor.

9. A method according to claim 6 further comprising forming at least one concave surface in the nozzle.

10. A method according to claim 6 further comprising forming at least one protrusion extending from the rotor.

11. A method according to claim 6 wherein the concave surface is formed using at least one of casting, machining, welding, coating, and a combination thereof.

12. An angel wing seal of a rotor rotatable about an axis in a turbine, blades carried by the rotor for rotation therewith, the turbine further including nozzles, said angel wing seal provided to inhibit ingestion of hot gas from a hot gas flow through the turbine into turbine wheel spaces, said angel wing seal comprising a seal body extending from a shank of said blade to a tip and generally toward the nozzle, said seal body comprising a first concave surface defined at said angel wing tip, and an outwardly curved surface defined along a length of a body portion extending from the rotor to said tip, said outwardly curved surface is radially inward from said first concave surface and extends outwardly from said angel wing body.

13. An angel wing seal according to claim 12 wherein said seal body comprises a second concave surface defined along a length of a body portion extending from the rotor to said first concave surface.

14. An angel wing seal according to claim 12 wherein the nozzle comprises a first protrusion extending towards the rotor, and at least one concave surface.

15. An angel wing seal according to claim 12 wherein the rotor comprises at least one protrusion extending outwardly from the rotor.

* * * * *